United States Patent [19]

Kemnetz et al.

[11] Patent Number: 5,558,777
[45] Date of Patent: Sep. 24, 1996

[54] OIL SPILL FLOCCULATING AGENT AND METHOD OF REMEDIATING OIL SPILLS

[75] Inventors: Steven Kemnetz, Trenton; Charles A. Cody, Robbinsville, both of N.J.

[73] Assignee: Rheox, Inc., Hightstown, N.J.

[21] Appl. No.: 421,106

[22] Filed: Apr. 13, 1995

[51] Int. Cl.⁶ ..................................... C02F 1/42
[52] U.S. Cl. .................... 210/691; 210/924; 210/690
[58] Field of Search ..................... 210/690, 691, 210/908, 909, 924

[56] References Cited

U.S. PATENT DOCUMENTS

| | | | |
|---|---|---|---|
| 2,367,384 | 1/1945 | Tymstra et al. | 210/693 |
| 3,589,844 | 6/1971 | Kraemer et al. | 210/924 |
| 3,676,357 | 7/1972 | Ciuti et al. | 210/691 |
| 4,182,690 | 1/1980 | Suzuki et al. | 252/358 |
| 4,386,010 | 5/1983 | Hildebrandt | 252/428 |
| 4,444,665 | 4/1984 | Hildebrandt | 210/660 |
| 4,470,912 | 9/1984 | Beall | 210/691 |
| 4,473,477 | 9/1984 | Beall | 210/691 |
| 4,517,094 | 5/1985 | Beall | 210/664 |
| 4,537,877 | 8/1985 | Ericcson | 210/924 |
| 4,549,966 | 10/1985 | Beall | 210/661 |
| 4,861,491 | 8/1989 | Svensson | 210/691 |
| 4,931,139 | 6/1990 | Phillips | 210/924 |
| 5,130,028 | 7/1992 | Cody et al. | 210/691 |
| 5,151,155 | 9/1992 | Cody et al. | 162/5 |
| 5,176,831 | 1/1993 | Rowsell | 210/631 |
| 5,238,575 | 8/1993 | Waldmann | 210/924 |
| 5,268,109 | 12/1993 | Boyd | 210/691 |
| 5,302,570 | 4/1994 | Newman | 210/924 |
| 5,401,418 | 3/1995 | Boyd | 210/691 |

*Primary Examiner*—Cynthia L. Nessler
*Attorney, Agent, or Firm*—Michael J. Cronin

[57] ABSTRACT

An organoclay made by the reaction of smectite clay and a quaternary ammonium compound derived from an oil having 50% or more of its carbon chain lengths consisting of $C_{14}$ or lower is described as an effective oil spill remediation agent. Oils used include coconut, babasso and palm-kennel oil. Such organoclay's effectiveness as an oil spill remediation agent, and that of organoclays can be increased by (a) further treatment with a water insoluble compound such as vegetable oil and b) by mixture with an organic fibrous material such as waste paper pulp. The agents produced are particularly effective in polar and arctic waters in maintaining buoyancy of the oil agglomeration formed by their use. Methods of remediating oil spills using organoclays particularly useful in regions such as waters of the Alaska oceans and inlets of the North Sea are also described.

5 Claims, 3 Drawing Sheets

FIG. 1

OIL SPILL FLOCCULATING AGENT AND METHOD OF REMEDIATING OIL SPILLS

BACKGROUND OF THE INVENTION

FIELD OF THE INVENTION

Oil Pollution Caused By Oil Spills

The growth of environmental consciousness combined with an ever-increasing use of petroleum products has led to a heightened awareness of the need promptly and effectively to remediate pollution caused by various petroleum-based activities. In addition, the diminishing production of domestic petroleum has caused an ever-expanding reliance upon foreign-produced oil. Except for Mexican and Canadian oil delivered by pipeline, all foreign oil must be delivered by ocean transport. Even Alaskan oil enters the continental United States by oil tanker. Despite increased governmental oversight and regulation, navigation over the oceans is inherently risky. Unpredictable weather, increased ocean traffic, mechanical defects, and negligence or intentional acts all contribute to the release of significant quantities of crude oil and petroleum products onto oceans, seas, bays, estuaries, and other waterways. In addition to vessel accidents, such discharges have been caused by warfare, illegal flushing of vessels' holds, offshore oil drilling and production platform accidents.

Oil contamination has produced severe environmental harm, as in coastal Alaska, resulting in mounting public and legislature concern. Oil spills are now recognized to result in extensive ecological and economic damage by destroying aquatic life, by fouling municipal water intakes, recreational beaches, boats, fish and harbors, and by interfering with a wide variety of aquatic recreational activities.

Methods of Remediating Oil Spills

Along with this increasing consciousness of the seriousness of the consequences of oil spills has come an increasing dissatisfaction with the traditional methods of cleaning spilled oil from oceans and bays. In former times, burning of the spilled oil was a preferred remedy. Such burning was always difficult to accomplish because of the natural difficulty of burning anything so closely associated with water as are oil spills. Burning also causes extensive air pollution, the Kuwait fires being only one example of how climate can be effected by such burning. In addition, burning is extremely dangerous, and can produce grave hazards to those engaged in remediation using such a technique.

Two other traditional methods of oil clean-up have also recently become less acceptable. One method is to allow micro-organisms and chemical processes to degrade petroleum molecules into relatively harmless substances ("bioremediation"). Another is to disperse the oil using the natural aids of weather and time, sometimes accelerated by the use of "dispersion aids" such as surfactants or soaps. These techniques are today considered as essentially equivalent to doing nothing. They are also now recognized to have severe limitations. Bio-remediation is such a slow process that much harm is usually caused before significant degradation occurs. Chemical dispersion does not remove oil, but rather spreads it more widely over a larger aquatic area, and hence brings it more closely into contact with both marine life and aquatic birds. The oil's particle size distribution becomes smaller while its geographic distribution increases. If the spill occurred in a coastal environment, the oil is likely to contact the shore, where it will cause unsightly conditions and unacceptable harm.

Using "sinking" chemicals, which cause spilled oil to increase its specific gravity so that it is out of sight under water is also very much out of style. Sinking has been determined to have uniquely detrimental side effects. Most importantly, it retards degradation of oil by aerobic bacteria, and incorporates it into underwater sediment, where it can be preserved for long periods of time, where it will prove toxic to benthic organisms. Areas near shore particularly have high levels of biological activity as evidenced by the presence of shrimp, shellfish, clams, crabs, mollusks and food fish. These valuable forms of life can be wiped out or harmed by introducing oil into their fragile habitations. Since a large number of oil spills occur close to shore, sinking is of limited application.

Oil Spill Treating Agents

The art has developed at least four classes of oil spill treating agents; solidifiers, demulsifying agents, surface-washing agents and dispersants. Several treating agent products in each of these categories have been offered to the marketplace.

Solidifiers or gelling agents solidify oil. Typically such agents require between 5% and 100% of agent by weight compared to the oil. De-emulsifying agents or emulsion breakers prevent the formation of or break water-in-oil emulsions. Surfactant-containing materials are of two types, surface-washing agents and dispersants. Of known surface washing agents, only a few agents have effectiveness of greater than 25%, where this is defined as the percentage of oil removed from a test surface. Dispersant effectiveness results have been reported-heavy oils show effectiveness values of about 1%, medium crudes of about 10%, light crude oils of about 30% and very light oils of about 90%. Many surface washing agents have been sold in the Noah American market with most, however, not still commercially available.

A number of agents which have been sold for various purposes, but do not cleanly fit into the above categories, include those that help trace or detect oil, those which are combinations of the categories described above, and those very esoteric items that are claimed to make oil disappear, or become non-toxic, for example.

It is estimated that scores of oil spill treating agents have been promoted at one time or another on the World market. This high number of products have caused difficulties to the potential remediator-customer, and even to environmentalists because such customer is often unable to discriminate between those products which will actually help the situation and those which are ineffective (and even cause further dispersion and damage).

Effectiveness has remained the major problem with most treating agents. Effectiveness is generally a function of oil type and composition. Crude and refined oil products have a wide range of molecular sizes and compositions including whole categories of materials like asphaltenes, alkanes, aromatics and resins. What is often effective for small asphaltene compounds in an oil may be ineffective on large asphaltenes. A treating agent for an aromatic compound may not be effective on a polar compound. Other major factors in agent effectiveness are environmental parameters such as low temperature and high sea energy. The effects of both oil composition and environmental parameters must be determined to establish the actual utility of a spill treating agent. A brief discussion of the different type of agents is instructive.

a) Solidifiers or Gelling Agents

Solidifiers are those agents which change oil from liquid to solid. Commercial agents often consist of polymerization catalysts and cross-linking agents. Agents which are actually sorbents are not generally considered to be gelling agents. Most such agents function, but required large amounts of agent to effectively solidify the oil. Under some situations the oil became a viscous thixotropic semi-solid which does not really aid in recovery. Because of the large amount of agent required, gelling agents have not been historically used nor stocked for use by spill remediators.

b) De-Emulsifiers or Emulsion Breakers

Several known prior art agents are available to break or prevent emulsions. Most agents are hydrophilic surfactants; that is, surfactants with a strong tendency to make oil-in-water emulsions. Such surfactants have the ability to revert the water-in-oil emulsion into two separate phases. A hydrophilic surfactant is more soluble in water than in oil and, for this reason, will quickly leave the oil. Such products are generally not useable on open water. There are at least two common uses for de-emulsifiers, one on the open seas to break or prevent the formation of emulsions, and in tanks to break recovered emulsions.

c) Surface-Washing Agents and Dispersants

Common oil spill treating agents are those containing surfactants as the major ingredient. These agents have been divided into two groups, dispersants and surface-washing agents. Dispersants are those agents which have approximately the same solubility in water and oil and cause the oil to be dispersed into the water in the form of fine droplets. Surface-washing agents are those agents which remove oil from solid surfaces such as beaches by the mechanism known as detergency. A product which is a good surface-washing agent is usually a poor dispersant and vice versa. Low dispersant effectiveness is a benefit for any product that will be used as a surface washing agent because oil can then be recovered rather than dispersed into the water column. Furthermore, because the two properties of surface-washing and dispersancy are at cross-purposes, highly effective products do not have a significant dispersant effectiveness. Many products display neither property adequately.

In this specification, the term oil spill means the physical presence of an oil or an oil-product floating on fresh or salt water. Although the bulk of the applications are on high seas, they are also useful for applications involving tanks, streams, harbors and sewage-treatment facilities.

Physical Removal of Oil Spills in Cold Water Environments

Actual physical removal (for example by "skimming" or pumping operations) is today ecologically the most preferred remedy for oil remediation. However, using prior art technologies, skimming has been found to be useful only under nearly ideal weather, water turbulence and response time conditions. Where ocean waves are high, more turbulent than normal, where winds or ocean currents are in excess of a few knots, where low and freezing temperatures exist, or where the periods of daylight are limited (as in northern waters in the winter), physical removal operations are likely to be ineffective, delayed, and extremely costly. More importantly, areas having consistently cold air and water temperatures, such as Alaska, the Arctic Ocean, the northern Atlantic Ocean, and the North Sea, make existing methods normally useless, even when seas are calm. Since oil spills often occur in such cold climates, the art has long looked to a product and a process for oil spill removal that would be "all-weather effective" as well as cost-efficient.

If a physical removal process is to be effective, the oil spill must be agglomerated and gathered together into a confined space on the water surface, for a sufficient period of time to permit removal or treatment operations. For the remediation of ocean oil spills, an agglomeration process and additive must possess two important physical properties: (1) it must provide good cold temperature solidification of oil, and (2) it must allow sustained buoyancy in salt or fresh water for the confined oil. The solidification of the oil is important so that it does not disperse over vast areas of ocean, magnifying the clean-up problem. It is very important that any product and process be able to solidify oil at low temperatures (0° C.) as well as at high temperatures (40°–45° C.), which would make the product universally effective for use in cold Arctic waters as well as tropical waters. Buoyancy of the additive is important as well, since it is necessary to keep the additive on the surface of the water to allow sufficient mixing time with the oil, and then to allow for collection of the agglomeration. Oil agglomeration is desirable because it aids in the physical gathering of the spilled oil. Proper agglomeration of this kind should produce relatively large patches of viscous oil instead of the normally—occurring very thin films of oil on the water's surface. This agglomeration action is brought about by mechanical and chemical action of the additive used upon the spilled oil.

Description Of The Prior Art

Bentonite clay may have been used in the past for the remediation of oil spills. Cleanup operations, however, using bentonite have not been widely employed because, although bentonite has a capability of temporarily adsorbing oil, its adsorption is unstable, and the oil is usually desorbed before the oil/bentonite agglomeration can, in a reasonable time, be physically removed or handled by chemical treatment. In addition, bentonite is water dispersible, and can therefore cause adsorbed oil to sink into the ocean, with resulting increases in environmental damage. Attapulgite clay, a non-smectite clay, treated with quaternary ammonium has been described in U.S. Pat. No. 4,444,665 as yielding a sorbent material effective for purifying liquids from organic components, although without any teaching of use as an remediation agent for oil spills.

Organoclays made from smectite-type clays have found useful in a variety of ways in related fields. Organoclays are the reaction product of a smectite clay, such as bentonite or hectorite, and one or more quaternary ammonium compounds. U.S. Pat. Nos. 4,517,094 and 4,549,966 issued to the Radecca Corporation show the use of organoclays in the treatment of waste water for the removal of contained organics. Two Rheox Inc. patents of one of the inventors of the invention described herein, U.S. Pat Nos. 5,130,028 and 5,151,155, describe the treatment of waste water and waste paper pulp with organoclays to remove organic contaminants, including ink, contained therein. U.S. Pat. No. 4,473,477 describes a method for controlling and containing organic material by sorbing it onto an organoclay. In a preferred embodiment, the organoclay is used as a liner in the form of a slurry wall or trench surrounding a waste disposal system. U.S. Pat. No. 5,028,388 describes a process for immobilizing noxious organic, particularly aromatic substances, by absorbing them on a layered clay mineral modified with a quaternary ammonium compound.

U.S. Pat. No. 5,176,831 describes the treatment of oil spills on natural bodies of water with amine-substituted water-swelling clays to "herd" the oil into islands of oil separated by surfaces of water. The quaternary compounds used are preferably those having at least 10 carbon atoms, with tallow-derived quaternaries shown in the patent's examples. The clays used include sodium montmorillonite and sepiolite.

SUMMARY OF THE INVENTION

The present invention involves the discovery that an organoclay made by the reaction of smectite clay and a quaternary ammonium compound derived from an oil having 50% or more of its carbon chains consisting of $C_{14}$ or lower can be used as an effective oil spill flocculating agent. An example of such a quaternary is dimethyl dicoco ammonium chloride. The quat is reacted in an amount of about 80% to 140% of the exchange capacity of the smectite clay. Such an organoclay has broad uses, and is particularly effective when handling oil spills in cold waters of the temperature found in polar and sub-polar regions, including the North Sea. Further, such organoclay's effectiveness, and that of organoclays generally, can be substantially increased if such organoclays are further treated with a water insoluble component such as a vegetable oil like soy bean oil, by waxes, non-water soluble fatty acids, aliphatic quats, or a petroleum oil.

Still further, if such treated or untreated organoclays are mixed with an organic fibrous material, such as paper pulp, ground newspapers, cotton or vegetable fibers, a novel product is created which possesses both especially advantageous agglomerating properties and cost-effectiveness when used to treat oil spills. Additionally, another significant advantage of the presence of the organic fibrous material is that the novel product can be used to form a useful cold temperature oil spill remediation agent, from organoclays prepared from quaternary ammonium compounds containing $C_{16}$ and longer alkyl groups. For example, an organoclay made from bentonite clay and dimethyl dihydrogenated tallow quaternary containing no organic fibrous material will have a cold temperature solidification of oil (CTS) value of $\geq 20°$ C.; however when made at a ratio of 1:1 organoclay-:paper pulp will possess a CTS of $0°$ C. or lower.

The invention herein optimizes organoclay-based compositions for oil spill remediation, taking into account the independent variables of (a) the chain length of the alkyl chains of the quaternary used to prepare the organoclay, (b) the amount of quaternary reacted with clay to form the organoclay, and the salt content of the organoclay (c) the presence of an insoluble component such as vegetable oil and (d) the amount of pulp needed/used, with the dependent variables being CTS and buoyancy.

BRIEF DESCRIPTION OF THE DRAWINGS

FIGS. 1 and 2 are discussed further in some detail in the explanation of the results of the scientific investigations reported in Examples 1 and 2 below.

DESCRIPTIONS OF THE PREFERRED EMBODIMENTS

Applicants have discovered that a particular class of organoclays is especially effective as an oil spill agglomerating chemical. Such agglomeration can be used to contain oil for recovery, using known physical methods, or for further chemical treatment on site. Such treatments could include chemical degradation or chemical-induced collection into discrete isolated oil patches or clumps. The effectiveness of these novel organoclay flocculating agents is particularly important in cold, hostile environments, where they provide both good buoyancy and good cold temperature solidification (CTS). Buoyancy, in terms of a remediation additive, can be described as the ability of an additive to float on a body of water, where that body of water can be either fresh water or salt water. The minimum buoyancy requirement which would have a practical application would be to have about 20% (by weight or volume) or more of an additive remain floating after standing 60–100 minutes on the surface of a body of water.

Cold Temperature Solidification (CTS) is an important property for an effective good remediation additive for oil spills. This is of value so that the oil will not spread over vast areas of water and exacerbate the clean-up problem. Many organoclay compositions will solidify oil at temperature $\geq 20°$ C. and thus can be used in tropical geographic regions with warm water temperatures. However it is desirable to have an additive which would solidify oil spills in arctic waterways at prevailing arctic air and water temperatures. Therefore, the lower the temperature for CTS effectiveness, the greater the value of the additive. Since, for example, the temperature of the North Sea at its surface varies between $6.5°$ C. and $14°$ C. annually, a CTS of approximately $10°$ C. delinates the boundary of an efficient CTS product. The procedure for measuring the CTS value can be found in Example 1.

Organoclays are made by known techniques by the reaction of quaternary ammonium compounds and smectite clays. See, for example, recent Rheox Inc. U.S. Pat. Nos. 4,894,182 and 5,075,033. Applicants' preferred inventive flocculating chemical is an organoclay made using in its production reaction bentonite clay and a dimethyl dialkyl quaternary compound (sometimes referred to as "quat") where the alkyl groups were derived from a coconut oil source and are primarily $C_{12}$ in carbon chain length. The organoclay can be made by a variety of methods, such as by a dilute water slurry, in a pugmill, in a pugmill under pressure, or as a combination of molten quat with clay, as long as the quat fully or almost fully exchanges onto the clay. The presence of a large number of exchange sites not reacted with quat or excess amounts of adsorbed quats will cause a loss in buoyancy-absorbed quats are quats which are not chemically-exchanged to the clay platelet's surface.

A type of quaternary ammonium compound particularly useful in this invention is dimethyl dicoco quaternary ammonium compounds. Such compound is a salt of an organic cation which has a positive charge localized on a single nitrogen atom, a charge-neutralizing anion designated $M^-$, and a carbon chain length distribution largely falling between $C_8$ and $C_{14}$. This quaternary ammonium compound has the following formula:

Such quaternary ammonium compound may be described as having four moieties where R and $R_1$ are organic radicals derived from a coconut oil source (or a synthetic coconut source) and $R_2$ and $R_3$ are methyl. $M^-$ is an anion, which usually is chloride, methyl sulfate, bromide, iodide, hydroxyl, nitrite or acetate. Mixtures of quaternary compounds can be used.

The oil source may be from a natural coconut source, or a synthetic version of same, or modifications of a naturally occurring different type oil such as tallow, using known techniques, to produce a derivative which has a carbon chain length distribution similar to that of coconut oil. Commercially available coconut fatty acid typically contains more short chain carbon groups than similar tallow fatty acid. A typical coconut oil analysis as to carbon chain length distribution is 5–10% $C_8$, 4–10% $C_{10}$, 45–50% $C_{12}$, 12–20% $C_{14}$, 7–10% $C_{16}$, and 1–4% $C_{18}$ alkyl groups. A typical tallow analysis shows that most of its carbon chain lengths are either $C_{16}$ or $C_{18}$.

Without being bound to a specific method of operation, it is believed that the presence of the short length carbon chains on the quaternary provides good low temperature solidification properties to the organoclay: large numbers of chain lengths of from $C_8$ to $C_{14}$ are particularly effective; chain lengths shorter than $C_8$ or $C_6$ do not cause the reacted quat to be tight bound chemically to the clay and could lead to an ionic organoclay that has poor buoyancy.

Further, although less preferred, the quaternary used can also be di or tri-substituted with alkyl groups of other natural oil-derived $C_8$–$C_{14}$ chains or mixtures of di and tri-substituted quaternaries, so that about 50% of the carbon chains are smaller than $C_{16}$. Natural oils such as babassu oil and palm-kernel oil fall within these ranges. It is also possible using standard techniques to take almost any natural vegetable or animal oil and break it up into various carbon chain lengths by "carbon-chain fractionation slicing", collect those that are $C_6$ to $C_{14}$, and make from these a quaternary compound useful in this invention.

A commercially-available dicoco quaternary compound of the type useful in this invention is sold under the tradename ADOGEN 462 by WITCO Chemical Company. A similar quaternary is offered for sale by the AKZO Chemical Company.

The clays used to prepare the organophilic clay agents of this invention are smectite-type clays which have a cation exchange capacity of at least 75 milliequivalents per 100 grams of clay. The cation exchange capacity of the smectite-type clays can be determined by either the well-known ammonium acetate method or the methylene blue technique. Particularly desirable types of clay are the naturally-occurring Wyoming varieties of swelling bentonites (and like clays) and hectorite, a swelling magnesium-lithium silicate clay. The clays, especially the bentonite-type clays, are preferably converted to the sodium form if they are not already in this form; crude clays and beneficiated clays also, can be used. Commercial bentonite clay normally has a cation exchange capacity of about 100 m.e.q., 100% natural clay basis. Smectite-type clays prepared synthetically by either a pneumatolytic or a hydrothermal synthesis process, can also be used to prepare the present organophilic clays.

The organophilic clays of this invention can be prepared by admixing the clay and organic cation together, preferably at a temperature within the range from 20° C. to 100° C., more preferably 60° C. to 75° C., for a period of time sufficient for the organic cation to react with the clay particles, followed optionally by recovery by filtration, washing, drying and grinding as necessary. Particle size of the organoclay, which plays a role in its effectiveness, can be controlled by grinding, with smaller particle sizes permitting improved dispersion when contacting the oil spill. The clay used during manufacture is preferably dispersed in a water slurry at a concentration of from about 1 to about 80%, and preferably from about 2% to about 7%, the clay/water slurry optionally may be centrifuged to remove non-clay impurities which often constitute of from about 10% to about 50% of the starting natural clay composition, the slurry agitated by stirring or other means, heated to a temperature in the range of from 140° F. (60° C.) to 170° F. (77° C.); the special quaternary ammo compounds added as described, preferably as a liquid in isopropyl alcohol or in a non-traditional solvent such as soya oil; and the agitation continued to effect and complete the reaction. Blending of the dry clay and the quaternary compound, such as with a pugmill, is also possible, and in some cases may be preferable.

The amount of the quaternary ammonium compound added to the clay for purposes of this invention must be sufficient to impart to the clay the enhanced characteristics desired. The amount of organic reacted with clay is approximately calculated as a percent of the cationic exchange capacity of the smectite clay, i.e. the milliequivalent amount of quaternary amine reacted with 100 g clay divided by the cation exchange capacity of the clay sample expressed as milliequivalents per 100 gram pure clay sample times 100 equals the percent organic, here after referred to in this application as "percent organic". The cation exchange capacity (CEC) of the clay can be determined using the methylene blue spot test which is well known in the art. Commercially available bentonite typically has a CEC of about 100. The organophilic clays of this invention should be prepared using about 80% to no more than about 140% organic. At lower percentages, the organophilic clays are ineffective as to buoyancy when used as flocculating agents. At higher percentages, the organophilic clays may sink. The preferred percent organic within the range of from about 80% to about 140% will vary depending on the characteristics of the oil to be treated and the temperature of the water where the oil has been discharged.

The organoclay agents of this invention may be added to oil-contaminated ocean water to contact the oil in widely varied ways and in various amounts depending on the system which will be used to remove the flocculated oil. A large variety of types of oil can be treated including crude oil particularly Noah Sea Brent grades, refined oil, marine oil, gasoline, lubricating fluids, bunker oils, naval stores, resins and mastics, asphaltic compositions, diesel fuels and non-petroleum oils such as castor oil and corn oil.

Higher rates of addition will cause formation of a buoyant semi-solid organoclay/oil mixture which can be physically removed by a number of systems including suction pumps. A preferred loading rate for providing such a mixture in a water temperature of 35° F. to 40° F. is greater than about 5.0 pounds of the inventive organoclay per barrel (approximately 50 gallons) of West Texas intermediate crude oil. Refined oil products such as gasoline or diesel fuel will require increased loadings. One of the advantages of applicant's invention over the prior art is that higher loadings can be used without the risk of causing the oil to sink.

The organoclay of the invention can be brought in contact with the oil to be agglomerated by a variety of techniques. The additive would be dispersed by the spraying of a powdered solid. In this case the powder is introduced to an air stream which is directed at the target area. It could also be dumped by airplane or helicopter employing crop dusting techniques and by a number of other conventional delivery techniques.

Use of a mechanical or other device to collect the flocculated oil/organoclay can be an effective way of removal. Such devices include flotation-containing structures, pumps and other suction devices, mechanical rakes, scoop nets and meshes.

In general, in a preferred process, the use of the agent of the invention can be briefly summarized as a process of (1) contacting oil in water with an organoclay made by reacting a coco-derived quaternary in the approximate percent organic range described and smectite clay, in an amount sufficient to cause agglomeration of the oil, and then (2) collecting such agglomerated oil and organoclay, for example, (i) by physical removal from the water or (ii) by treating, for example with chemicals, such agglomerated oil and organoclay in place in the water.

In another embodiment of the invention, the buoyancy in water of the above—described organoclay, and more conventional organoclays, can be increased by a variety of methods of reducing or eliminating soluble components in the organoclay. As described, the influence of the amount of organic reacted with clay on buoyancy is an important part of the present invention. The by-product from the organoclay reaction typically is a water soluble salt, more typically sodium or calcium chloride, where the displaced sodium on calcium reacts with the chloride accompanying the quaternary; it has been further discovered that the amount of residual salt left in the organoclay influences the buoyancy of the final product when used in flocculating oil. Any process which would selectively remove such salt will create an enhanced product. Further, the removal of any other soluble components from the organoclay, for example impurities from the quaternary amine solvent, will also improve the final product's performance. A representative process for removal of salt includes a washing process or a manufacturing process of the type described in U.S. Pat. No. 5,075,033 to assignee herein, the description of which is incorporated by reference.

The buoyancy of the novel inventive organoclay and conventional organoclays can be further improved by treating its surface with select non-water soluble components. Ideally a water insoluble, low specific gravity organic which is non-volatile, non-toxic and which readily sorbs or attaches on the organoclay's surface should be selected. Examples of such materials include vegetable oils, refined petroleum oils or silicon oils. The presence of such oil on the organoclay significantly improves its buoyancy over organoclays not containing such oil. A preferred loading of oil is in the amount of about 4% to 8% by weight; soya bean oil is particularly preferred.

Further improvement can be made to the organoclay additive by making it into a composition incorporating organic fibrous material, such material as paper pulp cotton fiber, vegetable fiber and newspaper pulp during formulation of the organoclay. All types of waste paper can be used including newsprint, magazines, cartons, legal forms and papers and the like. One method of making such composition is by taking waste paper pulp and adding it to a aqueous slurry containing bentonite and then adding the quaternary to the slurry. It has been found that waste paper shredded in an aqueous slurry containing bentonite clay using a paper pulper and then reacting the clay with quaternary or a quaternary/soya oil composition can lower the CTS temperature while simultaneously increasing the buoyancy, in a preferred embodiment. A preferred ratio of 50% paper pulp to 50% organoclay composition is most effective, although other ratios within a wide range are also useful. Improvement of oil holding capacity up to nearly fourfold compared to the organoclay alone is achievable. The addition of relatively inexpensive newspaper pulp to the organoclay represents a significant cost reduction in the product's raw material cost as well. This, in conjunction with excellent improvements made in CTS, buoyancy and oil holding capacity, provides the ocean oil spill remediation industry with a particularly valuable remediation product.

The reduction in CTS temperature obtained from using organic fibrous material is sufficient to allow the conversion of organoclays that are not effective at cold temperatures into useful cold temperature oil spill remediation agents. Not wishing to be bound by theory, it is believed that the formation of the organoclay/organic fibrous material product greatly increases the surface area of the organoclay allowing oil type products to more readily wet the organoclay surface leading to solidification at lower temperatures.

It should be understood that the organoclay compositions of this invention may further comprise other active ingredients and other components. Applicants' unique flocculation agents may contain additional ingredients and chemicals which may, in certain circumstances, aid in overall practice of this invention. For example, an organic anion may be used in the reaction preparing the organoclay-see U.S. Pat. No. 4,412,018—or one or more polar activators or preactivating agents combined with the prepared organoclay. Other active or inactive additives and chemicals can be incorporated as well to fulfill ancillary or unrelated purposes. Such chemicals could include pigments, such as titanium dioxide or dyes for oil-marking purposes, and bacterial agents to aid in oil-in situ digestion.

EXAMPLES

The following examples are given to illustrate the invention, but are not deemed to be limiting thereof.

Example 1

Experimental organoclays were prepared using dimethyl dihydrogenated tallow ammonium chloride (2M2Ht)-Commercial product Kemamine Q-9702-and dimethyl dicoco ammonium chloride-Commercial product Adogen 462. Beneficiated bentonite clay slurry was prepared and was found to contain 2.58% solids as determined by drying a representative sample at 105° C. to constant weight in a forced air oven. The bentonite clay slurry was then charged to a 3 liter stainless steel reactor equipped with baffles and a mechanical stirrer. The clay slurry was heated to 65° C. and reacted with various amounts of quaternary amine at 65° C. The amount of quaternary amine used in a series of reactions was varied from 86% to 140% organic. The reaction was held at 65° C. for 30 minutes at which point the resultant product was vacuum filtered in a Buchner funnel. The resulting organoclays were divided in half with one portion dried at 60° C. and the second portion dried at 105° C. both in a forced air oven. The dried organoclays were then milled in a centrifugal mill for two passes through a 0.5 mm screen.

Samples obtained were tested for cold temperature solidification (CTS) and buoyancy. The CTS test was performed by weighing separately 24 g of organoclay and 42 g transmission fluid (Dexron IIE). 2.5 mL of 2-propanol was taken up in a syringe and then these components were placed in a freezer. The freezer was set low enough to sustain a temperature of at least −10° C. After the temperature of the components have stabilized, the organoclay sample were hand mixed into the Dexron IIE fluid using a bimetal thermometer. When the organoclays were properly wetted into the system, the 2.5 mL 2-propanol was added. The samples were continuously mixed by hand and as the temperature rose, a point was reached where the transmission fluid thickened and would not flow to take the shape of a container. This was considered the end point (the CTS temperature) and the temperature of each sample was recorded.

The buoyancy on salt water test was performed by first preparing a 5% NaCl solution in water. 50 g of this solution was charged to a 4 oz. jar and 1 g of the organoclay sample was sprinkled on the top of the salt water. The starting time of the test was recorded and visual observations made of the amount of organoclay that settled versus time, which was recorded. The test was considered completed when the majority of the organoclay had settled to the bottom of the jar.

Figure 1:
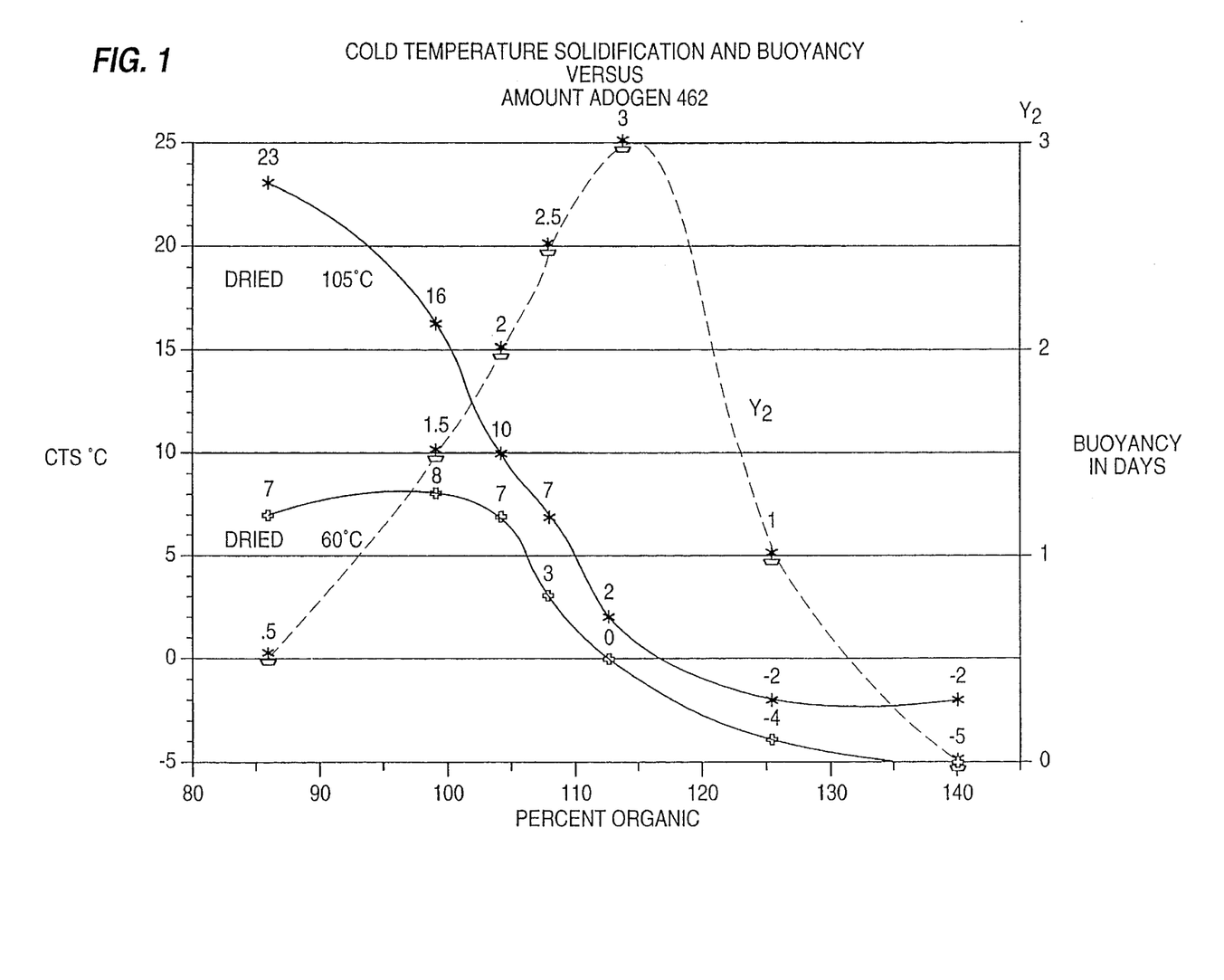
In FIG. 1, Cold Temperature Solidification (solid lines) and buoyancy in time (dashed line-axis $Y_2$) are plotted against the percent organic amount of dimethyl dicoco quaternary ammonium compound preferably used to make the inventive organoclay flocculating agent of the instant invention. This plot demonstrates that CTS, defined afterwards, is dramatically influenced by the percent organic amount of quaternary compound used. In general, increasing the percentage of quaternary the better the CTS value that was obtained. The buoyancy of the additive goes through a maximum with optimum buoyancy obtained at around 115 percent organic.

The test results of CTS and buoyancy recorded for the dimethyl dicoco ammonium chloride (Adogen 462)/bentonite organoclays are those shown in FIG. 1. Both CTS and buoyancy were plotted against the milliequivalent amount of Adogen 462 used to prepare each organoclay sample, expressed as percent organic amount.

These results demonstrate that CTS is dramatically influenced by the percent organic amount of Adogen 462 used. Excellent CTS values were obtained from organoclay prepared using 113% organic quaternary amine. If the percent organic amount of Adogen 462 used was kept above about 99%–104% organic, then detrimental effects of high temperature drying upon CTS value were minimized. At lower amounts the organoclay was sensitive to the organoclay drying temperature. Excellent buoyancy results are shown from organoclay containing about 90–126% organic of quaternary amine. This range produces an organoclay which possesses both good CTS and buoyancy. In that drying the organoclay at 60° C. or 105° C. did not produce a significant difference in the buoyancy test only one line is shown for both data sets.

Figure 2:
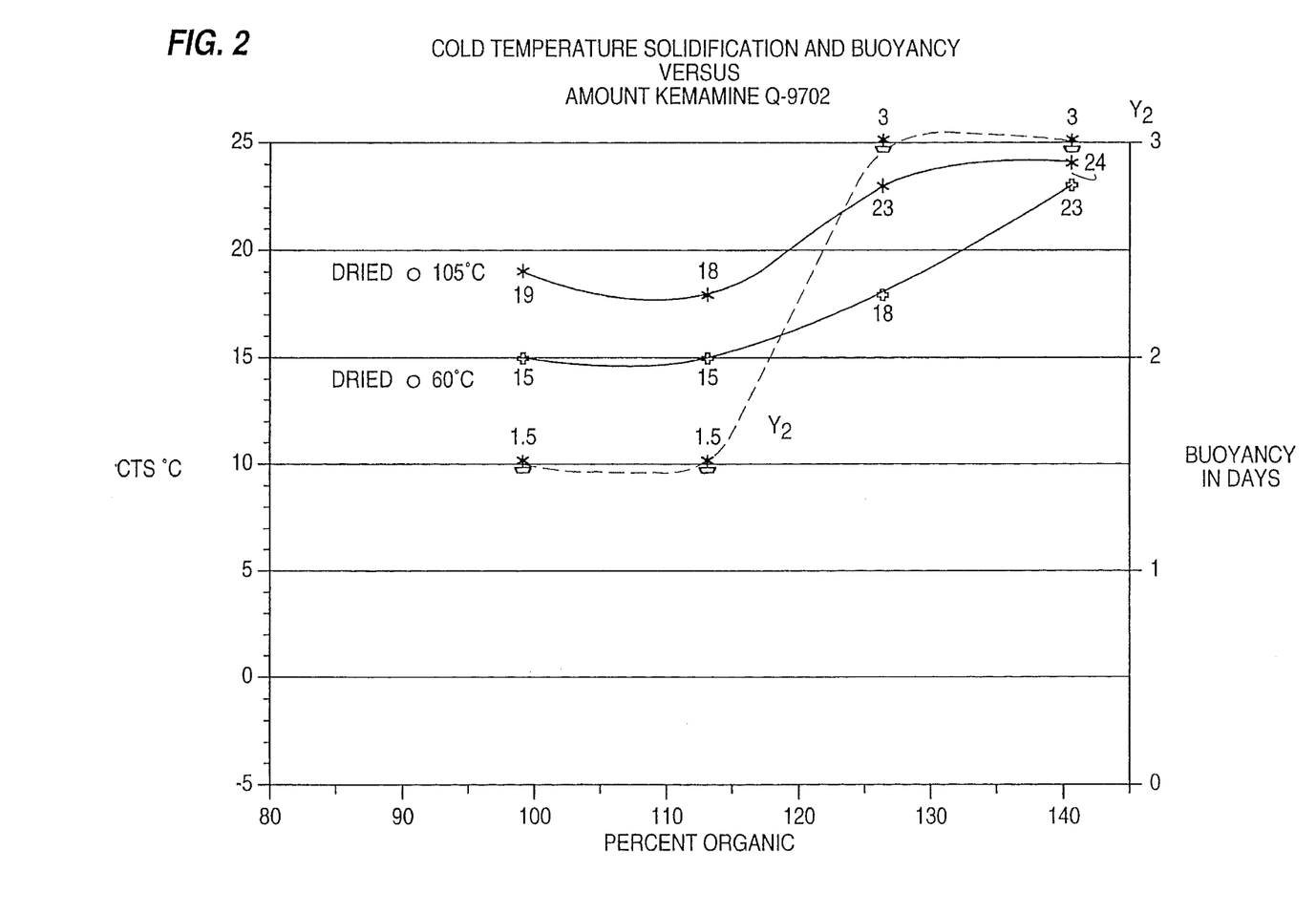
In FIG. 2 (on the same scale as FIG. 1), an organoclay made with dimethyl dihydrogenated tallow ammonium chloride, a higher molecular weight quaternary, is plotted as a comparison to show the advantage of the inventive organoclays in both CTS and buoyancy. Again CTS values are plotted using solid lines and buoyancy using a dashed line from the $Y_2$ axis. This plots demonstrates that low temperature CTS value were impossible to obtain at any of the percent organic amounts of quat used.

The comparative test results for the dimethyl dihydrogenated tallow ammonium chloride (Kemamine Q-9702)/bentonite organoclays is shown in FIG. 2. This graph demonstrated that the performance of the Kemamine Q-9702 organoclay is dramatically different from the inventive organoclays. Higher percent organic of quaternary amine produced less desirable (higher) CTS results. This plot demonstrates that the lower molecular weight coco quaternary amine has a unique performance advantage over the higher molecular weight tallow Kemamine Q-9702 when preparing an organoclay flocculation agent for oil spill remediation.

This example leads to a conclusion that the dimethyl dicoco ammonium chloride/bentonite organoclay provides unique performance advantages over a conventional organoclay.

Example 2

A series of comparative organoclays made with tallow-derived quaternaries were tested for both CTS and buoyancy. The results are reported in Table 1. In general these conventional organoclays are not very effective at satisfying both of these requirements. Organoclays prepared using tallow-derived quaternaries and containing a benzyl functionality on the quaternary amine had excellent buoyancy but poor cold temperature solidification. Organoclays prepared from tallow-derived aliphatic quaternary amines, in general, had better overall performance but were not effective at temperatures below 10° C. as a comparison of FIG. 1 and FIG. 2 demonstrates.

TABLE I

COLD TEMPERATURE SOLIDIFICATION AND BUOYANCY OF CONVENTIONAL ORGANOCLAYS

| Description | Buoyancy | Cold Temperature Solidification |
| --- | --- | --- |
| MB2Ht/SLS/SB/Bentonite | 6+ days | >25° C. |
| 2MBHt/SS/Bentonite | 3 days | >25° C. |
| 2MBHt/Hectorite | 3 days | >25° C. |
| M3Ht/Bentonite | 6 days | 25° C. |
| 2M2Ht/Bentonite | 3 hours | 17° C. |
| 2M2Ht/Crude Bentonite | — | 21° C. |
| 2M2Ht/HDO/Bentonite | 5 minutes | 18° C. |
| 2M2Ht/Hectorite | 3 hours | 17° C. |
| 2M2Ht/Bentonite | 1.75 hours | 20° C. |

SLS = Sodium Lauryl Sulfate
SB = Sodium Benzoate
SS = Sodium Stearate
HDO = 1,6 - Hexanediol
MB2Ht = Methyl Benzyl Dihydrogenated Tallow Ammonium Chloride
2MBHt = Dimethyl Benzyl Hydrogenated Tallow Ammonium Chloride
M3Ht = Methyl Trihydrogenated Tallow Ammonium Chloride
2M2Ht = Dimethyl Dihydrogenated Tallow Ammonium Chloride Example 3

An organoclay available on the commercial market—Commercial designation Imvitone 250—was determined to have been made using a dicoco quaternary ammonium compound. A test as to CTS and buoyancy was performed on Imvitone 250 with the result-determination of a unacceptable buoyancy of only 17 seconds and a CTS of 11° C.

Tests were conducted to determine if the dicoco quaternary ammonium compound used to make Imvitone 250 was fully reacted. 75 g of Imvitone 250 were slurried in 1500 ml water at 65° C. and reacted for 30 minutes. The sample was vacuum filtered, dried at 105° C. and milled in a centrifugal mill for two passes through a 0.5 mm screen. This reacted sample was tested for LOI, CTS, buoyancy and methanol solubles and compared against the original Imvitone 250 sample. Test results are shown in Table II.

TABLE II

IMVITONE 250 VERSUS REACTED IMVITONE 250

| | Imvitone 250 | Reacted Sample |
| --- | --- | --- |
| LOI *see below | 38.6% | 37.9% |
| Cold Temperature Solidification (CTS) | 11° C. | 2° C. |
| Buoyancy | 17 seconds | 2 days |
| Methanol Solubles | 20.5% | 14.1% |

The decrease in value of the methanol solubles is a direct indication that the hot water treatment had caused more quat to react with the commercial Imvitone 250 product. This test shows that the CTS of the reacted sample was lowered, buoyancy greatly improved and the amount of methanol solubles was significantly lowered by completing the clay-quat reaction. These results can be summarized as follows: An organoclay composed of fully or nearly fully reacted dimethyl dicoco quaternary ammonium dichloride (reacted with smectite clay) where the percent organic equals or exceeds about 100–115 displays outstanding floatability and CTS when used as an agent for remediation.

The influence of organoclay percent organic on buoyancy was previously shown. The loss on ignition (LOI) of an organoclay is controlled by the amount of organic quaternary mixed with the clay. It is often very useful to quantify the amount of organic material associated with the clay. A common method used to determine this is by loss on ignition (LOI). In this method a 1–2 gram sample of dry organoclay is analytically weighed into a fired crucible. The crucible is heated for 2 hours at 100° C., cooled in a desiccator and weighed again. The following equation is used to typically calculate LOI:

$$\frac{(W_d - W_c)}{W_d} \times 100\% = \text{Percent Loss on Ignition}$$

Example 4

In that sodium substituted clays are generally used to make organoclay, the by-product from this reaction is sodium chloride. An experiment was conducted where a bentonite based organoclay was prepared from dimethyl dicoco ammonium chloride at the preferred percent organic ratio. This organoclay was processed in a manner to obtain three samples containing different levels of sodium chloride in the final material. This was done by vacuum filtering the reaction slurry to obtain a very wet filter cake then drying it at 105° C. in a forced air oven. A second sample was obtained after vacuum filtering the reaction slurry to the practical limits where no additional water could be removed. The third sample was prepared by repulping part of the second sample at 5% solids in deionized water, then vacuum filtering. All three samples were dried at 105° C. in a forced air oven then milled six passes through a 0.5 mm screen at high rpm in a centrifugal mill. These three samples were tested for buoyancy with the results listed in Table III.

In the buoyancy test the organoclays were floated under still conditions on a 3.6% solution of Instant Ocean manufactured by Aquarium Systems, Mentor, Ohio. This solution contains many minerals commonly found in ocean water. The buoyancy test results show that after 2 hours of floating on stationary salt water the organoclay with a high sodium chloride level had poor buoyancy compared against organoclays with lower levels of salt. The buoyancy testing was expanded to measure the organoclays floatability on a dynamic body of water. This evaluation was performed with the use of a low speed mechanical shaker. In this test the jars containing the water and organoclay were mounted on a horizontal platform. This platform was then raised and dropped approximately one-half inch by a low rpm cam creating a gentle reproducible whirling motion within each jar. A visual estimate of the amount of organoclay that was floating was made at regular time intervals and is also shown in Table III. These test results show that a measurable improvement in buoyancy is found when additional sodium chloride is removed from the organoclay by repulping the wet filter cake. A conclusion was reached that the removal of any water soluble compounds from the organoclay will be beneficial for improving the buoyancy of the product.

TABLE III

SODIUM CHLORIDE CONTENT

| Sample Description | Buoyancy Static (2 Hours) | Buoyancy Dynamic | | |
|---|---|---|---|---|
| | | 5 mins | 10 mins | 15 mins |
| 1) High NaCl | 15% Floating | — | — | — |
| 2) Medium NaCl | 100% Floating | 50% | 20% | 10% |
| 3) Low NaCl | 100% Floating | 80% | 30% | 10% |

Example 5

Three organoclays were prepared containing 4%, 8% and 16% soya oil. The soya oil was mixed with Adogen 462 quaternary amine prior to reacting with the bentonite clay. These organoclays were prepared using a preferred amount of Adogen 462, along with various amounts of soya oil. The reaction product was washed to remove sodium chloride, dried at 105° C. and milled six passes through a 0.5 mm screen in a centrifugal mill at high rpm. These samples were tested for CTS and buoyancy with the test results shown in Table IV.

The results show that the presence of soya oil on the organoclay had no detrimental effect on CTS. The presence of the soya oil on the organoclay however significantly improved its buoyancy over a repulped (low NaCl) organoclay not containing soya oil. Increasing the soya oil loading did not change the buoyancy properties of the organoclay above those obtained from a 4% soya oil loading.

This example demonstrates the buoyancy of an organoclay can be improved by treating its surface with select organics. Any water insoluble, low specific gravity organic which is non-volatile and will readily sorb on the organoclay's surface is suited for this application. Good examples of such materials would include vegetable oils including soya, coconut and palm oil, petroleum oils, animal oils and fats and silicon oils.

TABLE IV

BUOYANCY AND CTS VERSUS SOYA OIL LOADING

| Description | CTS °C. | Buoyancy Static Test % Floating 1 Hour | Buoyancy Dynamic Test % Floating | | | |
|---|---|---|---|---|---|---|
| | | | 5 mins | 10 mins | 15 mins | 30 mins |
| Control (No Soya) | −2° | 100% | 50% | 30% | 5% | 0% |
| 4% Soya | −2° | 100% | 90% | 80% | 60% | 40% |
| 8% Soya | −3° | 100% | 80% | 70% | 50% | 20% |
| 16% Soya | −4° | 100% | 80% | 70% | 50% | 20% |

Example 6

This example shows the influence that the addition of newspaper pulp has on the performance of Adogen 462/bentonite clay and Adogen 462/soya oil/bentonite clay samples. Three different loadings of paper pulp (10%, 25% and 50%) were used with each of the two organoclay compositions.

The samples were prepared by adding different loadings by weight of newspaper pulp to the bentonite clay slurry and then mixing to disperse the pulp. This mixture was heated to 65° C. prior to reacting with 122% organic. The Adogen 462 was heated to 65° C. before adding it to the bentonite/paper pulp slurry and reacted 30 minutes at 65° C.; it was then vacuum filtered and dried at 105° C. in a forced air oven.

Soya oil was added to the Adogen 462 prior to reacting with the clay (8% soya oil based on final organoclay sample weight). All samples were tested for CTS and buoyancy, however, the dynamic buoyancy test was modified to more accurately reproduce agitation levels when very bulky samples were tested. Samples which contained paper pulp were very voluminous and 1 gram of sample would occupy a large portion of the head space above the Instant Ocean salt water. Having the head space above the salt water filled with the test sample dramatically lowered the agitation level during dynamic testing. Lower agitation levels incorrectly improved buoyancy test results for very voluminous samples. To correct this a fixed volume of test sample (3.5 cc) was used for both static and dynamic buoyancy tests. The experimental test results from this series are shown in Table V.

TABLE V

Evaluation of Organoclay/Paper Pulp Blends for
Ocean Oil Spill Remediation
Organoclays Prepared In-situ with the Paper Pulp

| Sample Description Organoclay (Adogen 462-bentonite)/ paper pulp | Soya Oil | CTS °C. | Buoyancy Test (% Flotation) | | | |
|---|---|---|---|---|---|---|
| | | | Static Test | | Dynamic Test | |
| | | | 1 hour | 5 min. | 10 min. | 15 min. |
| 100%/0% | 0 | 2 | 100% | 50% | 20% | 10% |
| 90%/10% | 0 | −10* | 70% | 0% | — | — |
| 75%/25% | 0 | −10* | 90% | 0% | — | — |
| 50%/50% | 0 | −10* | 100% | 90% | 30% | 10% |
| 0%/100% | 0 | −4* | 0% | — | — | — |
| 100%/0% | 8 | −3 | 95% | 70% | 50% | 30% |
| 90%/10% | 8 | −10* | 100% | 30% | 10% | 0% |
| 75%/25% | 8 | −10* | 100% | 80% | 0% | — |
| 50%/50% | 8 | −10* | 100% | 95% | 90% | 85% |

*Only ½ of the standard sample charge was required to solidify the automatic transmission fluid plus no polar activator was used.
Note: The buoyancy test results shown in this table were measured using a fixed volume of sample material (3.5 cc) instead of 1.0 gram of material.

The above data demonstrates that there is a preferred composition of about 50% (Adogen 462/soya oil/bentonite) 50% newspaper pulp where the organoclay will optimize the buoyancy test result. This composition produced a CTS of −10° C. and only required 12 grams of the standard 24 gram charge to solidify the automatic transmission fluid (ATF). The solidification of the ATF was so efficient that no polar activator was required. The buoyancy of the 50% (Adogen 462/soya oil/bentonite) 50% newspaper pulp was improved over the Adogen 462/soya oil/bentonite organoclay.

Example 7

Further experimentation was conducted to compare the oil holding capacity of 50% (Adogen 462/soya oil/bentonite) 50% newspaper pulp against an inventive organoclay alone. A spatula rub-out test was devised where the ATF was added dropwise to a known weight of test sample on a glass plate. The ATF was worked into the sample using a spatula. ATF was added until the sample no longer displayed powder-like qualities and started to liquefy. At that point the weight of ATF used was recorded and divided by the sample weight used.

The 50% (Adogen 462/soya oil/bentonite) 50% newspaper pulp material held 1.4 g ATF/g of sample compared against 0.37 g ATF/g of Adogen 462/soya oil/bentonite without pulp. This represents a 3.8 fold improvement in the oil holding capacity of the newspaper pulp bearing composition over the organoclay alone. In addition, inexpensive newspaper pulp at a 50% loading to the organoclay represents a significant cost reduction in the product's raw material cost.

Example 8

This example shows that the additives of this invention can continually and inexpensively be made by a pug mill process provided preparation conditions are selected to allow the reaction to go to completion. Several samples were prepared in a pug mill at various organoclay/newspaper pulp ratios of 100/0, 75/25, 50/50, 25/75, 10/90 and 0/100. The newspaper pulp was prepared using Philadelphia Enquirer newspaper that was pulped at 5% solids in water at room temperature using a Hockmeyer mixer. The pulp was then vacuum filtered to 18.3% solids to produce a consistency better suited for pug milling. Then the pulp was pug milled with the appropriate amount of crude bentonite clay at room temperature to form a good blend. The crude clay/pulp blend was then heated to 65° C. in a forced air oven. Separately, the appropriate amount of Adogen 462 and soya oil for each sample was blended together and heated to 65° C. The amount of Adogen 462 used was 113% organic based on pure unsheared bentonite clay (the crude clay including impurities used actually contained 77% bentonite). The amount of soya oil used was 8% by weight of the organoclay fraction of the sample. The Adogen 462/soya oil blend was pug milled with the crude clay/newspaperpulp/water blend at 65° C. All samples were dried in a 105° C. forced air oven and then milled in a centrifugal mill for one pass through a 0.5 mm screen. Each sample was then tested for cold temperature solidification of oil (CTS), buoyancy and oil adsorption with test results listed in Table VI.

Blends of 50/50, 25/75 and 10/90 newspaper pulp demonstrate outstanding CTS, buoyancy and oil adsorption properties. The 100% newspaper sample had an excellent CTS value, as demonstrated in previous work, but had only very limited buoyancy on salt water. The static buoyancy test reported 100% floating after one hour but most of the sample was wetted after the hour and only remained floating because of entrapped air in the fibers. Gentle agitation during dynamic testing released the air and all the wetted material sank within seconds.

This example shows that a viable product for the remediation of ocean oil spill can be prepared at low cost in a pug mill and that a wide variety of pulp to organoclay ratios are effective for remediation. The low material cost for the newspaper in conjunction with high reaction throughput in the pug mill will further lower cost.

TABLE VI

| Sample Ratio Organoclay/Pulp | CTS °C. | Buoyancy Static % Floating 1 hour | Dynamic % Floating 5 mins | 10 mins | 15 mins | 2 hrs | Oil Adsorption gATF*/g Sample |
|---|---|---|---|---|---|---|---|
| 100/0 | >20° | 0% (10 mins) | — | — | — | — | 0.84 |
| 75/25 | –5°** | 50% | 0% | — | — | — | 1.70 |
| 50/50 | –4°** | 100% | 100% | 100% | 99% | 40% | 4.2 |
| 25/75 | –4°** | 100% | 100% | 100% | 99%+ | 40% | 4.5 |
| 10/90 | –4°** | 100% | 100% | 100% | 99% | 40% | 4.0 |
| 0/100 | –4°** | 100% (wetting) | 60% | 40% | 30% | — | 6.4 |

*ATF — Automatic Transmission Fluid
**Only ½ of the standard sample charge was required to solidify the automatic transmission fluid plus no polar activation was required.
+All buoyancy values are visual estimates of the amount of additive still floating on the NaCl solution. A value of 99% was assigned in recognition of a very small amount of material observed settling.

Example 9

This example demonstrates that the improvement in buoyancy found from the addition of soya oil to the organoclay is independent of the quaternary amine used to prepare the organoclay. Four organoclays were prepared using two different quaternary amines, with and without the addition of soya oil to the organoclay system. The two quaternary amines used were methyl benzyl dihydrogenated tallow ammonium chloride (MB2Ht) and dimethyl dihydrogenated tallow ammonium chloride (2M2Ht). Both quaternary amine were separately reacted with a beneficiated nonsheared bentonite clay slurry in a 3 l stainless steel beaker equipped with baffles. The clay slurry was first heated to 65° C. then the molten quaternary amine (65° C.) was added to the clay slurry and reacted for 30 minutes at 65° C. under good agitation. In all cases the amount of quaternary amine reacted with the clay was 108% organic. The resulting product was vacuum filtered in a Buckner funnel and washed with deionized water to remove water soluble salts. The washed cake was dried at 105° C. in a forced air oven then milled in a centrifugal mill one pass through a 0.5 mm screen then once through a 0.2 mm screen.

Two additional organoclays were separately prepared using the same procedure described above except soya oil was added to the two quaternary amines prior to reaction with the clay. The amount of soya oil used was 8% by weight of the final organoclay. The four samples were used to determine CTS and buoyancy values which are shown in Table VII along with oil adsorption. These results clearly show the advantage of using soya oil for improving the buoyancy of organoclays regardless of the quaternary amine used in their preparation.

Example 10

This example demonstrates the CTS effectiveness of an organoclay made with a 100% $C_{10}$ quaternary ammonium compound, prepared by fat-synthesis carbon chain length slicing from a natural oil. Two organoclays were prepared using 30 grams each of a beneficiated non-sheared bentonite clay slurry at 2.91% solids. This clay slurry was charged to a 3 l stainless steel beaker equipped with baffles and mixed using a six blade turbine mixer. The clay slurry was heated to 65° C. prior to reacting with Bardac 2250 (manufactured by Lonaz) which was also heated to 65° C. Bardac 2250 is a dimethyl didecyl ammonium chloride. The amount of Bardac 2250 used for each reaction was 108% organic and 126% organic respectively. After adding the quaternary amine, the reaction was held at 65° C. for 30 minutes under agitation sufficient to create a slight vortex. Both reactions were then vacuum filtered, washed with 400 ml deionized water and dried at 60° C. in a forced air oven. The samples were milled in a centrifugal mill, two passes through a 0.5 mm screen prior to testing for CTS (See Table VIII).

TABLE VIII

| Percent Organic | CTS |
|---|---|
| 108% | 9° C. |
| 126% | 9° C. |

Example 11

This example shows how the CTS of an organoclay and its effectiveness depends on the carbon chain length of the quaternary used.

TABLE VII

Improvement of Buoyancy with the Use of Soya Oil

| | CTS | Static 1 HR | Buoyancy Dynamic 5' | 10' | 15' | Adsorption Mineral Oil g Oil/g Sample |
|---|---|---|---|---|---|---|
| 108% organic MB2Ht/Bentonite | 13° C. | 100% | 95% | 90% | 85% | .32 |
| 108% organic MB2Ht & Soya)/Bentonite | 16° C. | 100% | 100% | 99% | 99% | .20 |
| 108% organic 2M2Ht/Bentonite | 20° C. | 100% | 95% | 85% | 50% | .34 |
| 108% organic 2M2Ht & Soya)/Bentonite | 17° C. | 100% | 100% | 99% | 99% | .36 |

A non-sheared beneficiated bentonite clay slurry (30 grams clay, 2.91% solids) was charged to a 3 l stainless steel beaker equipped with baffles and a six blade turbine mixer. The clay slurry was heated to 65° C. and reacted with a blend of two different quaternary amines. The blend was prepared from Adogen 462 which is a dimethyl dicoco ($C_{12}$) ammonium chloride and Kemamine Q-9702C which is dimethyl dihydrogenated tallow ($C_{18}$) ammonium chloride both manufactured by Witco Chemical Co. This blend contained two equal pans, that is 54% organic of Adogen 462 and organic Kemamine Q-9702C for a total of 108% to produce an organoclay containing a 1 to 1 molar blend of the dialkyl quaternaries. The blend was added to the bentonite clay and allowed to react for 30 minutes. The reaction was then vacuum filtered; washed with 400 ml DI $H_2O$ and dried at 60° C. in a forced air oven. The dry organoclay was milled in a centrifugal mill for two passes through a 0.5 mm screen.

The CTS value of this sample was measured and compared against CTS values obtained from two organoclays prepared from Adogen 462 and Kemamine Q-9702C described in Examples 1 and 2 respectively.

Figure 3:
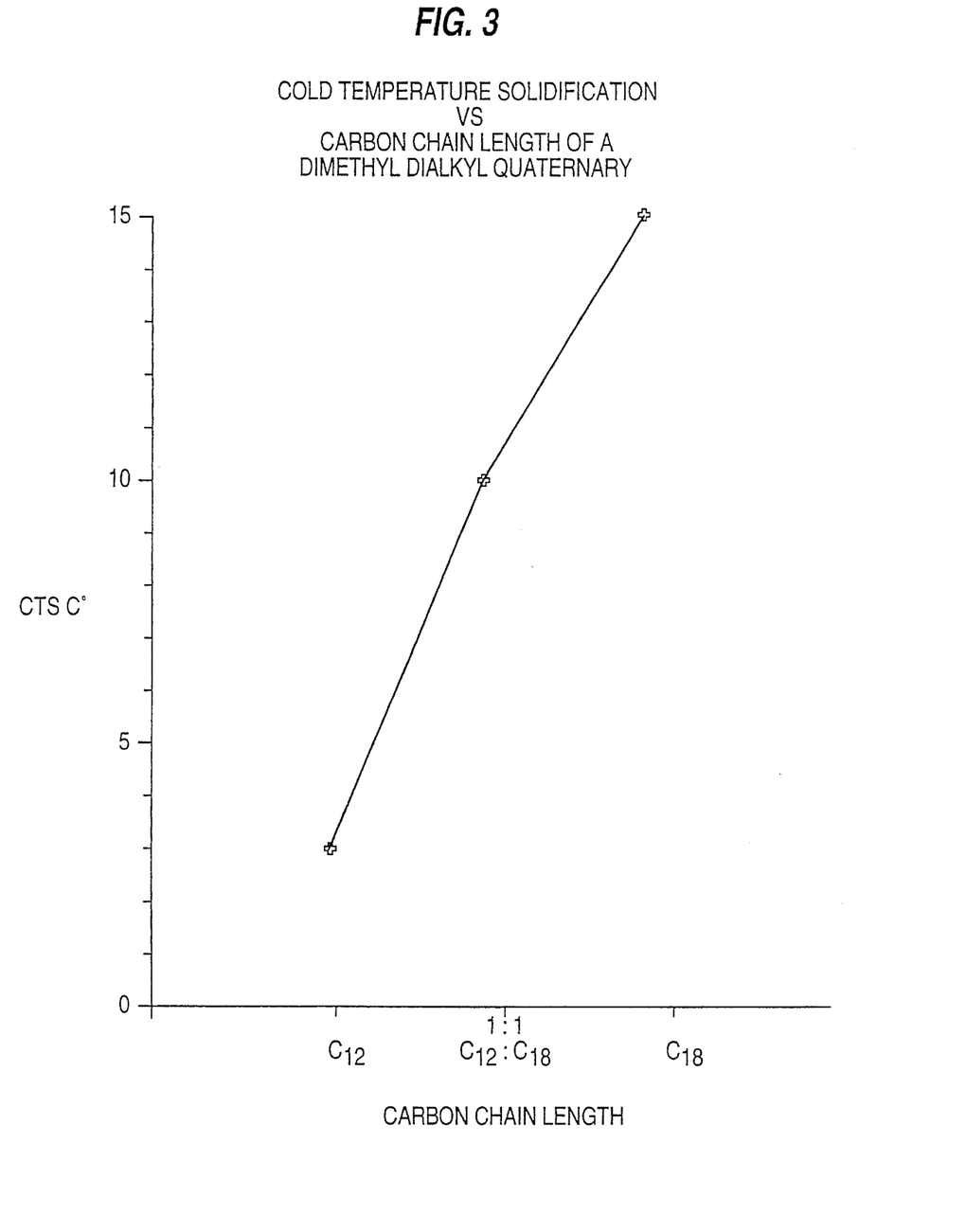
FIG. 3 shows graphically the effect on cold temperature solidification (CTS) of the carbon chain length of a dimethyl dialkyl quaternary used to make an organoclay treatment agent and is discussed in Example 11 below.

A pilot of this comparison is shown in FIG. 3.

Example 12

This example demonstrates that other organic fibrous material could be used in place of paper fibers. Cotton was chosen because it is readily available. In this experiment, cotton fibers from pharmaceutical grade cotton was cut into approximately ½ inch segments and mixed with a beneficiated bentonite clay slurry in a 3 liter stainless steel beaker. The mixture was heated to 65° C. under agitation from a Cowles dispersator. Separately in a beaker Adogen 462 and soya oil were mixed together and heated to 65° C. The amount of Adogen 462 used was 113% organic. The soya oil was 8% by weight of the organoclay weight. The final weight ratio of organoclay to cotton was 1:1. The Adogen 462/soya oil blend was added to the clay/cotton mixture and allowed to react for 30 minutes at 65° C. The reaction product was then vacuum filtered and dried at 105° C. in a forced air oven. The resulting product could not be milled because the fibrous nature of the material would not allow it to pass through a screen. This material was tested for CTS and buoyancy and compared against a similar sample prepared from paper pulp and treated cotton with test results shown in Table IX.

TABLE IX

Remediation Properties of Cotton Fibers versus Paper Fiber when prepared Insitu with Organoclay.

| Description | CTS °C. | Buoyancy Static 1 hour | Dynamic 5 min. | 10 min. | 15 min. |
|---|---|---|---|---|---|
| 1:1 Organoclay/ Cotton | −10° C. | 100% | 100% | 99% | 99% |
| 1:1 Organoclay/ Paper Pulp | −10° C. | 100% | 100% | 95% | 80% |
| Untreated Cotton | — | 0% (3 sec.) | — | — | — |

Example 13

This experiment demonstrates a method of preparing an organoclay in-situ with paper pulp which has good CTS and buoyancy properties, with the organoclay being prepared from a quaternary amine which contains long chain (>$C_{14}$) alkyl groups. Two samples were prepared in this experimental series. The first sample was prepared using beneficiated bentonite clay slurry charged to a 3 l stainless steal beaker equipped with baffles and agitated with a six blade turbine mixer. The clay slurry was heated to 65° C. Separately, 108% organic of a dimethyl dihydrogenated tallow ammonium chloride (2M2Ht) Kemamine Q-9702 was mixed with soya oil and heated to 65° C. This mixture was added to the clay slurry and allowed to react for 30 minutes at 65° C. The resulting product was vacuum filtered in a Buchner funnel and washed with deionized water to remove water soluble salts. The washed cake was dried at 105° C. in a forced air oven, then milled three passes through a 0.5 mm screen in a centrifugal mill. This material was tested for CTS and buoyancy properties.

A second sample was prepared in the same manner as described above except paper pulp was added to the bentonite clay slurry prior to reaction; the weight of newspaper (Philadelphia Inquirer) added to the clay slurry was sufficient to produce a 1:1 weight ratio of (organoclay/soya oil): paper pulp. The newspaper was cut into small strips, added to the clay slurry and shredded using a Cowles dispersator in a 3 l stainless steal beaker. The resulting product was tested for CTS and buoyancy with test data shown in Table X.

TABLE X

Remediation Properties of (2M2Ht/Soya Oil/Bentonite)/Paper Pulp Buoyancy

| | CTS | Static | Buoyancy Dynamic (mins) | | |
|---|---|---|---|---|---|
| | °C. | 1 hour | 5 | 10 | 15 |
| 2M2Ht/Soya/ Bentonite | 20° | 100% | 100% | 100% | 100% |
| (2M2Ht/Soya/ Bentonite)/Pulp | −16° | 100% | 100% | 100% | 99% |

This experiment demonstrates a method for converting organoclays made from quaternary ammonium compounds that normally possess CTS values greater than 10° C. into useful cold temperature (<10° C.) oil spill remediation agents.

We claim:

1. A process for remediating oil spills in water where the temperature of the water is about 10° C. or lower comprising:

(a) contacting oil on water with an organoclay on the surface of the water in an amount sufficient to cause agglomeration of the oil and the organoclay which organoclay has been made by the reaction of smectite clay and one or more quaternary ammonium compounds at a present organic ratio of from about 99% to about 140% of the cation exchange capacity of the clay wherein the quaternary compound is derived from an oil source selected from the group consisting of a naturally occuring coconut oil, a synthetic version of a naturally occuring coconut nut oil and modification of other naturally occuring oils to produce a derivative which is similar to coconut oil with a carbon chain distribution wherein about 50% or more of the carbon chains are $C_8$ to $C_{14}$ and then;

(b) collecting such agglomerated oil and organoclay from the surface of the water.

2. The process of claim 1 wherein at least one of the coco-derived quaternary ammonium compounds in dimethyl dicoco quaternary ammonium compound.

3. The process of claim 1 wherein the method of collecting the agglomerated oil and organoclay is selected from the group consisting of physical removal and chemical treatment in place.

4. The process of claim 1 wherein the smectite clay is selected from the group consisting of sodium bentonite and hectorite and one or more of the quaternary ammonium compounds is a quaternary ammonium chloride compound.

5. The process of claim 4 wherein the organoclay is made by a process that selectively reduced the amount of residual salt left in the organoclay as a result of the retraction of displayed sodium from the smectite clay with the chloride of the quaternary ammonium chloride compound.

* * * * *